United States Patent
Jan et al.

(10) Patent No.: US 10,784,533 B2
(45) Date of Patent: Sep. 22, 2020

(54) LI—SN—O—S COMPOUND, MANUFACTURING METHOD THEREFOR AND USE THEREOF AS ELECTROLYTE MATERIAL OF LI-ION BATTERIES, AND LI—SN—O—S HYBRID ELECTROLYTE

(71) Applicant: Institute of Nuclear Energy Research, Atomic Energy Council, Executive Yuan, R.O.C., Taoyuan (TW)

(72) Inventors: Der-Jun Jan, Taoyuan (TW); Dong-Hau Kuo, Taoyuan (TW); Roger Lo, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 51 days.

(21) Appl. No.: 16/171,286

(22) Filed: Oct. 25, 2018

(65) Prior Publication Data
US 2020/0112049 A1 Apr. 9, 2020

(30) Foreign Application Priority Data
Oct. 9, 2018 (TW) .............................. 107135641 A

(51) Int. Cl.
*H01M 10/056* (2010.01)
*H01M 10/0525* (2010.01)
*C01G 19/00* (2006.01)

(52) U.S. Cl.
CPC ........ *H01M 10/056* (2013.01); *C01G 19/006* (2013.01); *H01M 10/0525* (2013.01); *H01M 2300/0071* (2013.01); *H01M 2300/0085* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 2009/0226809 A1 | 9/2009 | Vu et al. | |
| 2016/0104891 A1* | 4/2016 | Holme | H01M 4/808 429/303 |
| 2016/0380315 A1* | 12/2016 | Weicker | H02J 7/34 320/136 |
| 2017/0005367 A1* | 1/2017 | Van Berkel | H01M 10/0562 |

* cited by examiner

*Primary Examiner* — Scott J. Chmielecki
(74) *Attorney, Agent, or Firm* — Cheng-Ju Chiang

(57) ABSTRACT

A Li—Sn—O—S compound, a manufacturing method therefor and use thereof as an electrolyte material of Li-ion batteries, and a Li—Sn—O—S hybrid electrolyte are provided. The Li—Sn—O—S compound of the present invention is laminated Sn—O—S embedded with lithium ions. The Li—Sn—O—S compound is represented by the formula $Li_{3x}[Li_xSn_{1-x}(O,S)_2]$, where $x>0$. The manufacturing method for a Li—Sn—O—S compound includes the following steps of: (S1000) providing a Sn—O—S compound; (S2000) adding a lithium source into the Sn—O—S compound to form a Li—Sn—O—S precursor; and (S3000) performing calcination on the Li—Sn—O—S precursor in a vulcanization condition.

4 Claims, 6 Drawing Sheets

LI—SN—O—S COMPOUND, MANUFACTURING METHOD THEREFOR AND USE THEREOF AS ELECTROLYTE MATERIAL OF LI-ION BATTERIES, AND LI—SN—O—S HYBRID ELECTROLYTE

BACKGROUND

Technical Field

The present invention relates to a Li—Sn—O—S compound, a manufacturing method therefor and use thereof as an electrolyte material of Li-ion batteries, and a Li—Sn—O—S hybrid electrolyte.

Related Art

Li-ion batteries are mainly composed of components such as positive electrodes, negative electrodes, separators, electrolytes, and structural shells, where the electrolytes allow current to be conducted in the form of ions in the batteries. Most of the lithium batteries currently used on the market contain liquid electrolytes having spilled combustion and explosion troubles. In order to reduce carbon dioxide emissions from automobiles, the world has moved toward lithium battery-based electric vehicles. However, the lithium batteries which are widely used at present are mainly based on liquid electrolytes. The safety, stability and discharge capacity are always the pursuing focus of battery efficiency.

Further, dendritic lithium of the existing liquid electrolytes has the problems of short-circuit ignition, no flame retardancy of polymer electrolytes and the like. Therefore, commercialization of all-solid-state lithium batteries with high safety has become one of the most urgent issues in the global industry. In terms of electric vehicle development, development of solid electrolytes is a trend in the future. In addition, considering the commercialization needs, the manufacturing process simplicity and the economic performance also need to be met.

SUMMARY

A main object of the present invention is to provide a Li—Sn—O—S compound.

Another object of the present invention is to provide use of the Li—Sn—O—S compound as an electrolyte material of Li-ion batteries.

Another object of the present invention is to provide a Li—Sn—O—S hybrid electrolyte.

Another object of the present invention is to provide a manufacturing method for a Li—Sn—O—S compound.

The Li—Sn—O—S compound of the present invention is laminated Sn—O—S(SnOS) embedded with lithium ions.

In an embodiment of the present invention, the Li—Sn—O—S compound is represented by the following formula (I):

where x>0.

In an embodiment of the present invention, the Li—Sn—O—S compound is represented by Li[Li$_{1/3}$Sn$_{2/3}$(O,S)$_2$].

In an embodiment of the present invention, the Li—Sn—O—S compound is represented by Li$_2$Sn(O,S)$_3$.

The Li—Sn—O—S hybrid electrolyte of the present invention contains the Li—Sn—O—S compound and a gel polymer electrolyte.

In an embodiment of the present invention, the gel polymer electrolyte adopts polyacrylonitrile (PAN) as a substrate.

In an embodiment of the present invention, the gel polymer electrolyte adopts polyvinylidene fluoride (PVDF) as a substrate.

The manufacturing method for a Li—Sn—O—S compound of the present invention includes the following steps of: (S1000) providing a Sn—O—S compound; (S2000) adding a lithium source into the Sn—O—S compound to form a Li—Sn—O—S precursor; and (S3000) performing calcination on the Li—Sn—O—S precursor in a vulcanization condition.

In an embodiment of the present invention, the step (S1000) sequentially includes the following steps: (S1100) providing a tin (II) chloride solution; (S1200) adding thioacetamide (TAA) into the tin (II) chloride solution; (S1300) adding hydrazine into the tin (II) chloride solution and raising the temperature of the solution for a reaction; (S1400) collecting a solid product obtained by the reaction.

In an embodiment of the present invention, the lithium source is selected from a group consisting of one or a combination of lithium nitrate, lithium acetate, lithium carbonate, and lithium metal.

DETAILED DESCRIPTION

A Li—Sn—O—S compound of the present invention is laminated Sn—O—S(SnOS) embedded with lithium ions.

In an embodiment of the present invention, the Li—Sn—O—S compound is represented by the following formula (I):

where x>0.

In an embodiment of the present invention, the Li—Sn—O—S compound is represented by Li[Li$_{1/3}$Sn$_{2/3}$(O,S)$_2$].

In another embodiment of the present invention, the Li—Sn—O—S compound is represented by Li$_2$Sn(O,S)$_3$.

More specifically, when the Li-to-Sn molar ratio is 2, the lithium conductivity is the best, and a Li[Li$_{1/3}$Sn$_{2/3}$(O,S)$_2$] compound is formed by [Li$_{1/3}$Sn$_{2/3}$(O,S)$_2$] octahedral layers which are filled with Li$^+$ layers.

The Li—Sn—O—S hybrid electrolyte of the present invention contains the Li—Sn—O—S compound and the gel polymer electrolyte. In other words, the Li—Sn—O—S compound can be used as an electrolyte material.

The gel polymer electrolyte contains but is not limited to polyacrylonitrile and polyvinylidene fluoride as substrates.

Figure 1:
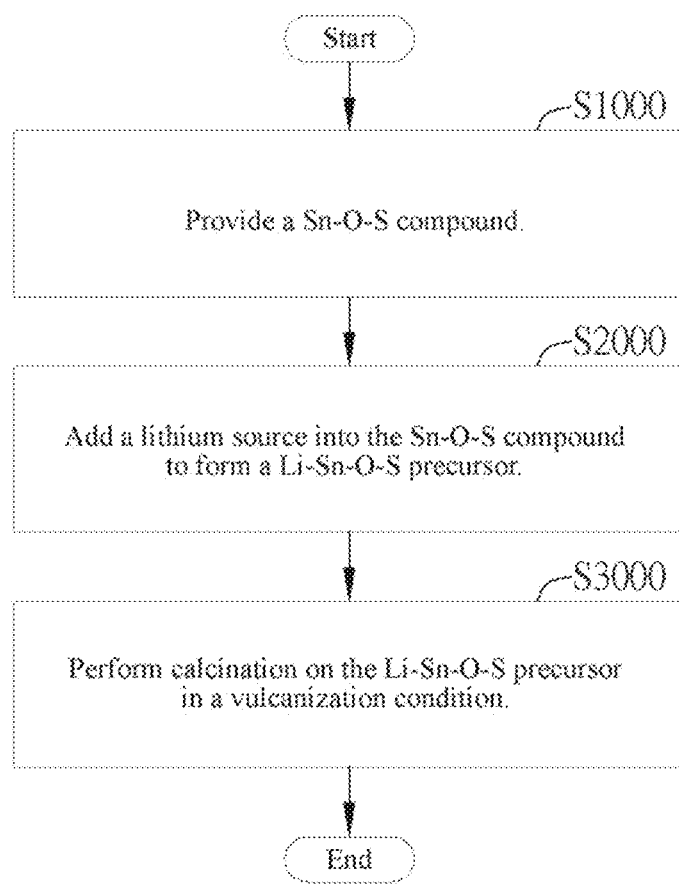
FIG. 1 is a schematic flowchart of a manufacturing method for a Li—Sn—O—S compound according to an embodiment of the present invention.

In the schematic flowchart shown in FIG. 1, the manufacturing method for a Li—Sn—O—S compound according to an embodiment of the present invention includes the following steps.

In step (S1000), a Sn—O—S compound is provided. More specifically, a sulfur oxide (SnOS) is prepared by using an aqueous phase synthesis method. Metal cations, sulfur anions and oxygen ions are used and precipitated, and the method includes the following steps of: (1) taking and adding 5.6 g of tin (II) chloride (98%, Alfa Aesar, USA) into 500 ml of deionized water to form a white tin (II) chloride solution and stirring the solution uniformly for 30 minutes; (2) adding 1.87 g of thioacetamide (99+%, Sigma-Aldrich, USA) into the aqueous solution, stirring the solution for 30 minutes and then raising the temperature of the solution to 95° C.; (3) adding 0.3 ml of hydrazine ($N_2H_4 \cdot H_2O$) (Sigma-Aldrich, USA); (4) 3 hours later after the reaction is completed at 95° C., conducting standing for precipitation; (5) conducting washing with high-purity alcohol, centrifugation and collection and finally removing a solvent through a vacuum condenser to obtain a product.

In step (S2000), a lithium source is added into the Sn—O—S compound to form a Li—Sn—O—S precursor. More specifically, in an embodiment, lithium nitrate (Sigma-Aldrich, USA) which is easier to store is used, and nitrate radical produces gas of nitrogen oxides so as to leave the powder during calcination treatment. Before the calcination treatment, the Li—Sn—O—S precursor is prepared according to the Li-to-Sn molar ratios of 1:1, 1.5:1, 1.8:1, 2:1, 2.2:1 and 3:1 separately, and materials are mixed and placed in an oven (Channel, VO-30L, Taiwan) for 12 hr to remove water molecules from the air adsorbed by $LiNO_3$. However, in different embodiments, the lithium source including lithium such as lithium acetate, lithium carbonate, and lithium metal can be used.

In step (S3000), calcination is performed on the Li—Sn—O—S precursor in a vulcanization condition. More specifically, reaction precursor powder is heated at a rate of 10° C./min under 1 atm argon, the temperature is kept at 300° C. for half an hour, and then calcination is performed under a vulcanization condition at 500° C., 550° C. or 600° C. for 3 hours for a reaction to synthesize Li—Sn—O—S compound powder. The vulcanization condition refers to a condition of providing sulfur source vapor, and the adopted sulfur source includes one or a mixture of elemental sulfur and sulfide (hydrogen sulfide, tin sulfide, stannous sulfide and copper sulfide).

When the Li-to-Sn molar ratios of the Li—Sn—O—S precursor after calcination at 550° C. are 1:1, 1.5:1, 1.8:1, 2:1, 2.2:1 and 3:1, the ionic conductivities at room temperature are $2.71*10^{-5}$, $3.90*10^{-5}$, $1.17*10^{-4}$, $1.92*10^{-4}$, $1.13*10^{-4}$ and $5.98*10^{-5}$ Scm$^{-1}$, respectively.

When the Li-to-Sn molar ratio of the Li—Sn—O—S precursor is 2:1, the ionic conductivity of the Li—Sn—O—S precursor obtained after calcination at 500° C., 550° C. or 600° C. at room temperature is $2.71*10^{-5}$, $1.92*10^{-4}$ and $1.09*10^{-5}$ Scm$^{-1}$, respectively.

Manufacturing of the Test Batteries

Figure 2:
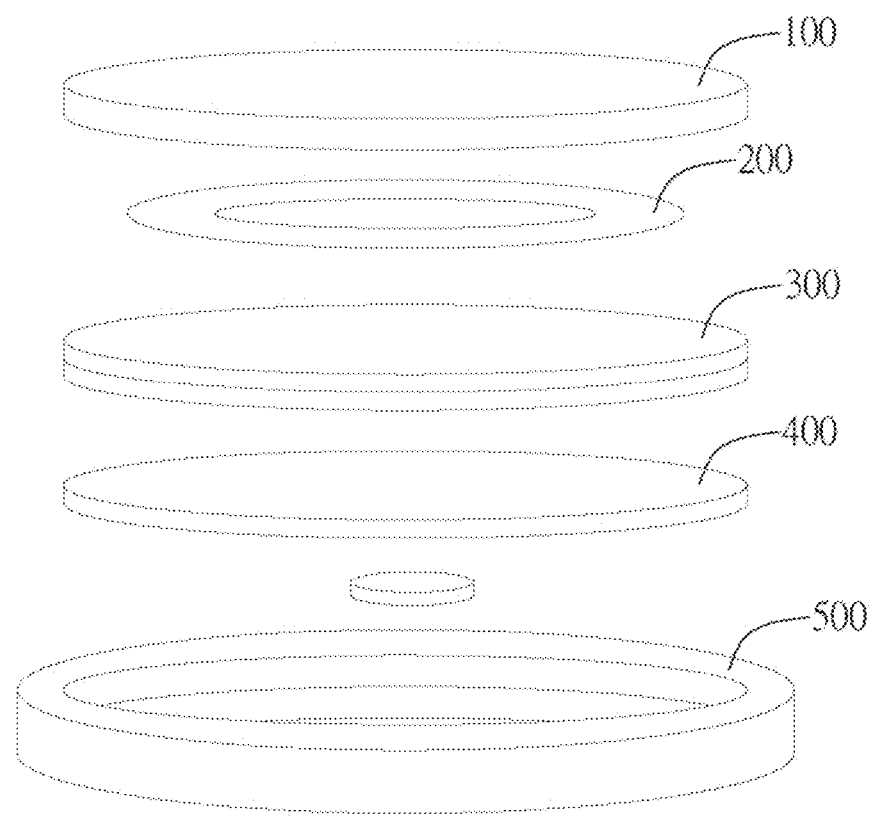
FIG. 2 is a schematic structural diagram of test batteries.

Granular polyvinylidene fluoride-co-hexafluoropropylene (PVDF-HFP) (Aldrich, USA) is weighed and added into a solution, acetone is added, the temperature is raised to 60° C., and stirring is conducted to make PVDF-HFP completely dissolved; a lithium salt ($LiClO_4$) (99.99%, Aldrich, USA) and sulfolane (99%, Aldrich, USA) are added and uniformly stirred for 2 hr, and after the solution is completely transparent and free of particles, the synthesized Li—Sn—O—S compound powder is added, where the Li—Sn—O—S compound powder is obtained from the precursor in the laboratory according to a formula that the Li-to-Sn molar ratio is 2:1 and calcination is conducted at 550° C., and the synthesized Li—Sn—O—S compound powder contains ceramic powder at the weight ratios of 10%, 30% and 50%; stirring is continued for 4 hr to completely mix the powder and the solution, and then the mixture is applied on a Teflon mold; the mold is placed in an oven at 60° C. to form a hybrid membrane after acetone is volatilized, and then the membrane is placed in a glove box, so that adsorption of moisture in the atmosphere is avoided, and the internal ions of the gel electrolyte membrane reach equilibrium for about 4 hours. Finally, the batteries adopt LiSnOS-550 (that is, the calcination temperature is 550° C.)/polymer for constituting the hybrid electrolyte, the manufactured button type solid lithium batteries adopt $LiCoO_2$ as the positive electrode and the Li metal as the negative electrode, and the structure is shown in FIG. 2.

Figure 3A:
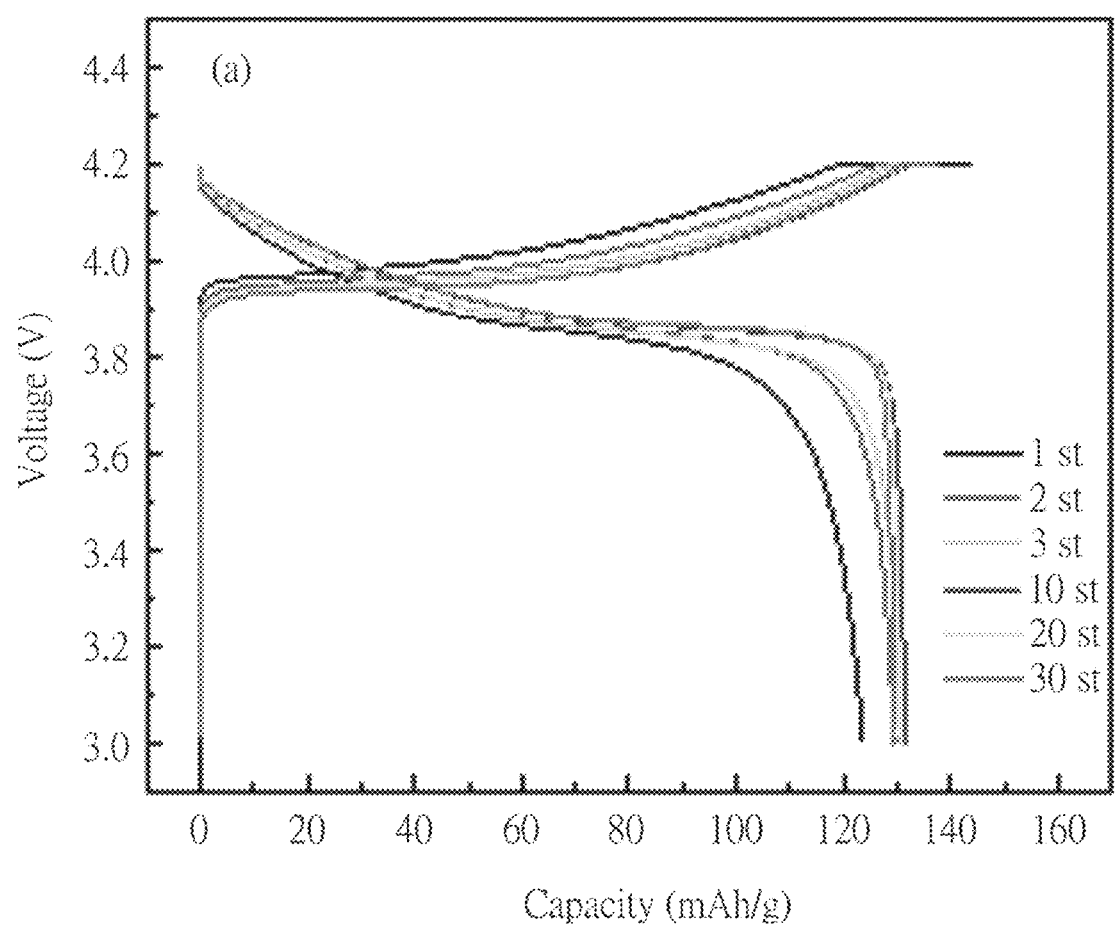
FIG. 3A, FIG. 3B, FIG. 3C and FIG. 3D are diagrams of charging and discharging test results of batteries manufactured by using 0, 10%, 30% and 50% of the Li—Sn—O—S compound respectively.
Figure 3B:
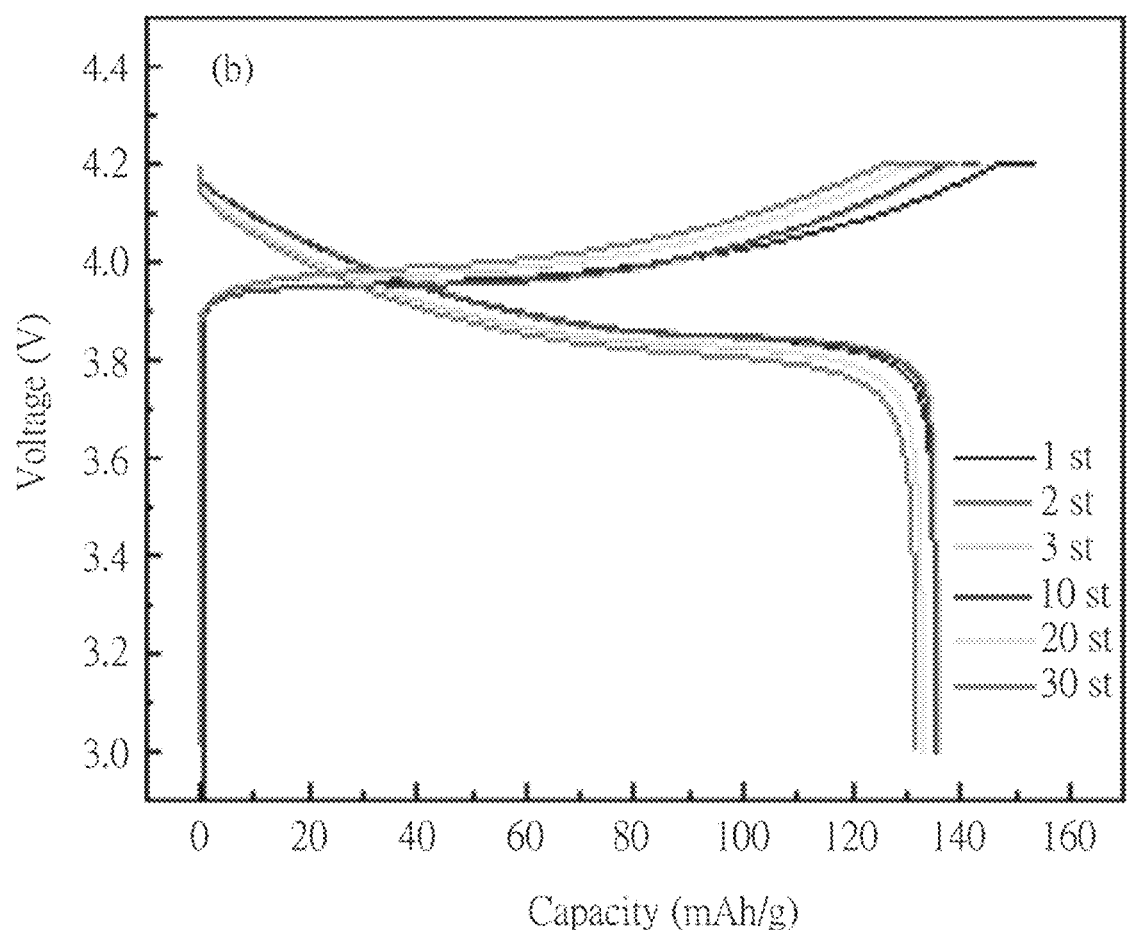
Figure 3C:
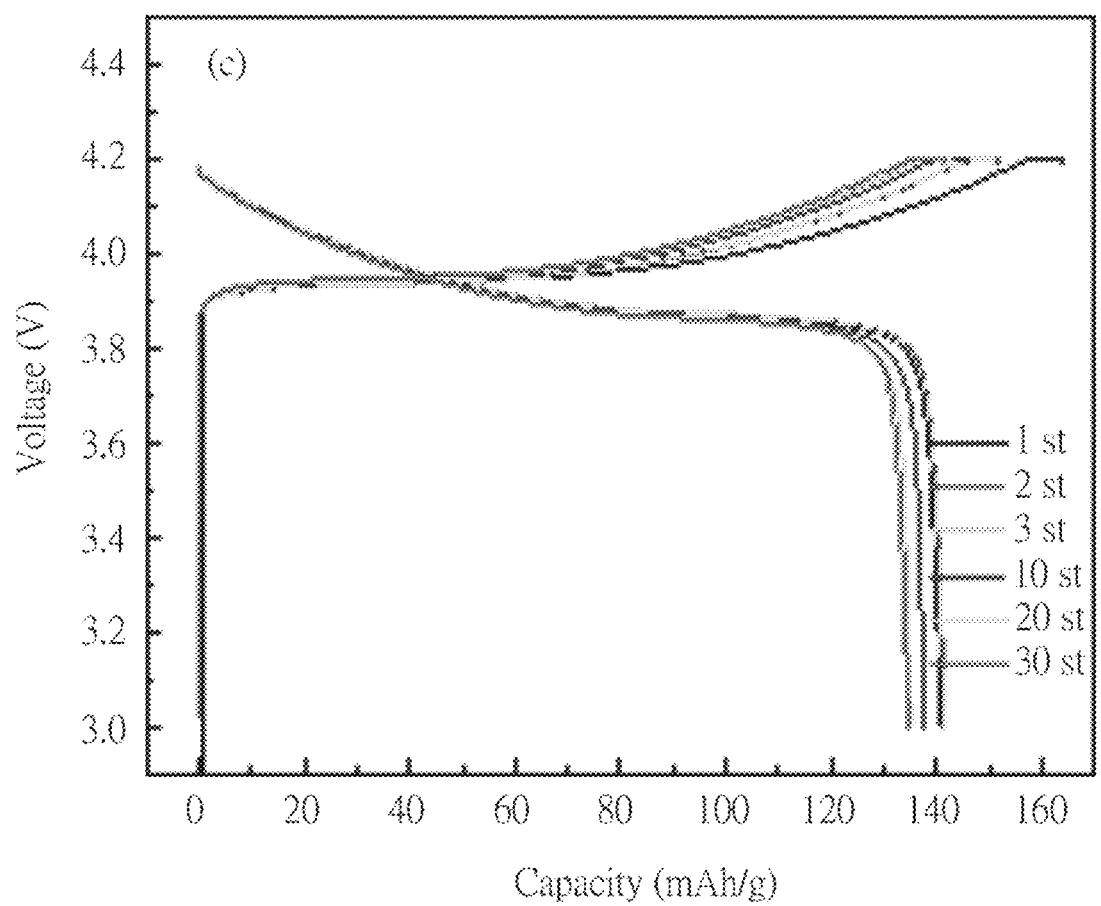
Figure 3D:
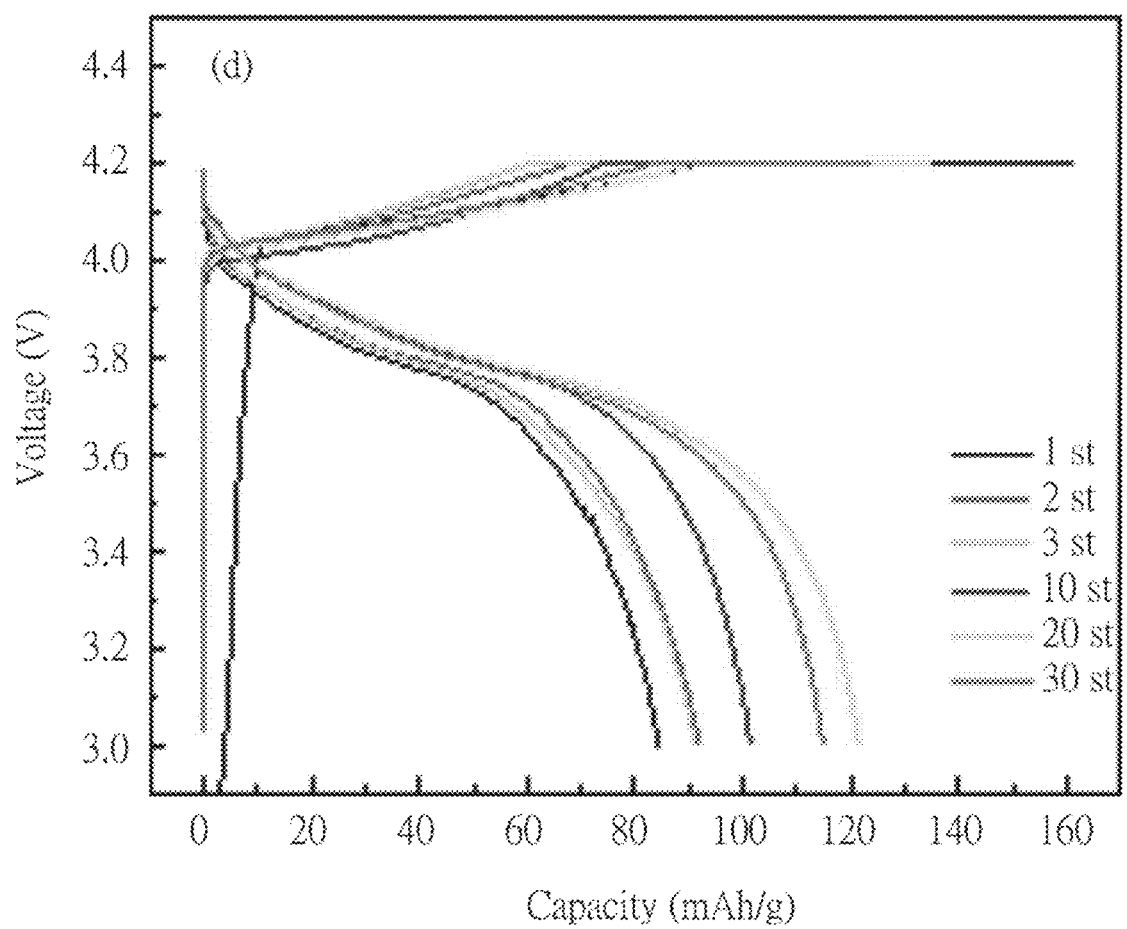

The manufactured test batteries are subjected to a charging and discharging test and an efficiency test by cyclic voltammetry (CV), and results are shown in FIG. 3A to FIG. 3D. It can be seen from the test results that under charging and discharging loop experiments for 30 times, the two groups of test batteries of 0% LiSnOS-550 or pure gel PVDF-HFP and 30% LiSnOS-550/gel PVDF-HFP have good efficiency. As shown in FIG. 3C, the Li-ion battery prepared by using the hybrid electrolyte of 30% $Li_2SnOS$-550/polymer has better discharging capacity of 134.6 mAh/g and coulombic efficiency of up to 95% under charging and discharging loop experiments for 30 times; as shown in FIG. 3A, the discharging capacity of the Li-ion battery prepared by using the hybrid electrolyte of 30% $Li_2SnOS$-550/polymer is higher than that of the Li-ion battery made by pure gel PVDF-HFP, and the discharging capacity of the Li-ion battery made by pure gel PVDF-HFP is 129.6 mAh/g.

From the above, it can be known that the Li—Sn—O—S electrolyte of the present invention is easy to prepare, and used chemicals have low risks. In addition, the Li—Sn—O—S electrolyte has no moisture-sensitive problems of sulfides and has the stability of oxides and better lithium conductivity than oxides, and the powder has the flame-stopping capability for polymer combustion when applied to the gel polymer.

Although the above description and figures have revealed the preferred embodiments of the present invention, it is necessary to understand that various additions, many modifications and substitutions can be used in the preferred embodiments of the present invention without departing from the spirit and scope of the principle of the present invention as defined in the claims attached. One of ordinary skill in the art of the present invention should understand that modifications of various forms, structures, arrangements, ratios, materials, elements and components can be made on the present invention. Therefore, the embodiments disclosed herein are used for illustrating the present invention rather than limiting the present invention. The scope of the present invention should be defined by the claims attached, covers legal equivalents thereof and is not limited to the foregoing description.

SYMBOL DESCRIPTION

100 Negative electrode shell
200 Elastic sheet
300 Gasket/lithium sheet
400 Li—Sn—O—S compound ingot
500 Positive electrode shell
S1000 Step
S2000 Step
S3000 Step

What is claimed is:

1. A Li—Sn—O—S compound, wherein the Li—Sn—O—S compound is laminated Sn—O—S embedded with lithium ions;

wherein the Li—Sn—O—S compound is represented by the following formula (I):

$$Li_{3x}[Li_xSn_{1-x}(O,S)_2],  \quad \text{Formula (I)}$$

wherein x>0.

2. The Li—Sn—O—S compound according to claim 1, wherein the Li—Sn—O—S compound is represented by $Li[Li_{1/3}Sn_{2/3}(O,S)_2]$.

3. The Li—Sn—O—S compound according to claim 1, wherein the Li—Sn—O—S compound is represented by $Li_2Sn(O,S)_3$.

4. A Li—Sn—O—S hybrid electrolyte, comprising:
the Li—Sn—O—S compound according to claim 1; and
a gel polymer electrolyte.

\* \* \* \* \*